United States Patent [19]
Takaragi et al.

[11] Patent Number: 5,103,479
[45] Date of Patent: Apr. 7, 1992

[54] ENCIPHER METHOD AND DECIPHER METHOD

[75] Inventors: Kazuo Takaragi, Ebina; Fusao Nakagawa, Yokohama; Ryoichi Sasaki, Fujisawa, all of Japan

[73] Assignees: Hitachi Ltd.; Hitachi Control Systems, Inc., both of Japan

[21] Appl. No.: 618,892

[22] Filed: Nov. 27, 1990

Related U.S. Application Data

[63] Continuation of Ser. No. 343,808, Apr. 27, 1989, Pat. No. 4,982,429.

[30] Foreign Application Priority Data

Apr. 28, 1988 [JP] Japan .................. 63-103919

[51] Int. Cl.⁵ .................. H04L 9/06; H04L 9/28
[52] U.S. Cl. .................. 380/28; 380/29; 380/50; 380/23; 380/25; 235/380
[58] Field of Search .................. 380/3-5, 380/9, 22-25, 28, 29, 33, 37, 42, 46, 49, 50; 235/380, 382

[56] References Cited

U.S. PATENT DOCUMENTS

| | | | |
|---|---|---|---|
| 4,319,079 | 3/1982 | Best | 380/4 |
| 4,982,429 | 1/1991 | Takaragi et al. | 380/28 |

OTHER PUBLICATIONS

Shimizu et al., "Fast Data Encipherment Algorithm FEAL"; Papers of the Institute of Electronics & Communication Engineers of Japan; D. vol. J70-D, No. 7, pp. 1413-1423; Jul., 1987.

Primary Examiner—Bernarr E. Gregory
Attorney, Agent, or Firm—Antonelli, Terry, Stout & Kraus

[57] ABSTRACT

There are provided an encipher method of enciphering message data made by a microcomputer or the like at a high speed by using encipher keys which have previously been stored in a smart card or the like and a decipher method of deciphering the ciphertext made by the encipher method at a high speed by using the encipher keys. The encipher method and the decipher method are suitable for, particularly, a 32-bit microcomputer and include a process expressed by the function $Rot_2i(x)$ (i=2, 3, 4) in each process. $Rot_2i(x)$ is the process to circular shift a data train x of 32 bits to the left or right by $2^i$ bits (i=2, 3, 4).

10 Claims, 13 Drawing Sheets

FIG. 11
PRIOR ART

| 32 | 1  | 2  | 3  | 4  | 5  |
|----|----|----|----|----|----|
| 4  | 5  | 6  | 7  | 8  | 9  |
| 8  | 9  | 10 | 11 | 12 | 13 |
| 12 | 13 | 14 | 15 | 16 | 17 |
| 16 | 17 | 18 | 19 | 20 | 21 |
| 20 | 21 | 22 | 23 | 24 | 25 |
| 24 | 25 | 26 | 27 | 28 | 29 |
| 28 | 29 | 30 | 31 | 32 | 1  |

EXTENSIONAL PERMUTATION TABLE

FIG. 12
PRIOR ART

BLOCK

| | | | | | | |
|---|---|---|---|---|---|---|
| $B_1$ | $r_{32}$ | $r_1$ | $r_2$ | $r_3$ | $r_4$ | $r_5$ |
| $B_2$ | $r_4$ | $r_5$ | $r_6$ | $r_7$ | $r_8$ | $r_9$ |
| $B_3$ | $r_8$ | $r_9$ | $r_{10}$ | $r_{11}$ | $r_{12}$ | $r_{13}$ |
| $B_4$ | $r_{12}$ | $r_{13}$ | $r_{14}$ | $r_{15}$ | $r_{16}$ | $r_{17}$ |
| $B_5$ | $r_{16}$ | $r_{17}$ | $r_{18}$ | $r_{19}$ | $r_{20}$ | $r_{21}$ |
| $B_6$ | $r_{20}$ | $r_{21}$ | $r_{22}$ | $r_{23}$ | $r_{24}$ | $r_{25}$ |
| $B_7$ | $r_{24}$ | $r_{25}$ | $r_{26}$ | $r_{27}$ | $r_{28}$ | $r_{29}$ |
| $B_8$ | $r_{28}$ | $r_{29}$ | $r_{30}$ | $r_{31}$ | $r_{32}$ | $r_1$ |

FIG. 13
PRIOR ART

| SUBSTITUTION TABLE NUMBER | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| [0 0] | 14 | 4 | 13 | 1 | 2 | 15 | 11 | 9 | 3 | 10 | 6 | 12 | 5 | 9 | 0 | 7 |
| [0 1] | 0 | 15 | 7 | 4 | 14 | 2 | 13 | 1 | 10 | 6 | 12 | 11 | 9 | 5 | 3 | 8 |
| [1 0] | 4 | 1 | 14 | 8 | 13 | 6 | 2 | 11 | 15 | 12 | 9 | 7 | 3 | 10 | 5 | 0 |
| [1 1] | 15 | 12 | 8 | 2 | 4 | 9 | 1 | 7 | 6 | 11 | 3 | 14 | 10 | 0 | 6 | 13 |

SUBSTITUTION TABLES OF S. BOX (S1)

ENCIPHER METHOD AND DECIPHER METHOD

This application is a continuation of application Ser. No. 343,808, filed Apr. 27, 1989, now U.S. Pat. No. 4,982,429.

BACKGROUND OF THE INVENTION

The present invention relates to an encipher method to encipher a plaintext and to a decipher method to decipher the ciphertext made by the encipher method.

As conventional typical encipher algorithms, the DES algorithm (Data Encryption Algorithm) and the FEAL algorithm (Fast Encryption Standard) have been known. The DES algorithm has been described in detail in, for instance, (1) Koyama et al., "Modern Theory of Encryption", The Institute of Electronics and Communication Engineers of Japan, pages 41 to 49, September 1986. On the other hand, the FEAL algorithm has been described in detail in, (2) Shimizu et al., "Fast Data Encipherment Algorithm FEAL", Papers of the Institute of Electronics and Communication Engineers of Japan, D. Vol. J70-D, No. 7, pages 1413 to 1423, July 1987.

The nonlinear calculation part in the DES process, that is, the process which is called an S (Substitution) box will now be described.

First, in accordance with the DES algorithm, data R ($r_1, r_2, \ldots, r_{32}$) of, for instance, the lower 32 bits in an input plaintext of 64 bits is magnified into data R' of 48 bits by an extensional permutation table shown in FIG. 11.

As shown in FIG. 12, the magnified data R' comprises eight blocks $B_1$ to $B_8$ each consisting of six bits.

The data R of 32 bits is divided into groups of four bits. One bit is added before and after each group of four bits. In this manner, each of the blocks ($B_1$ to $B_8$) is made to total six bits.

According to the extensional permutation table shown in FIG. 11, as the bits to be added, for instance, as shown by $r_4$ and $r_9$ in block $B_2$ in FIG. 12, the bit ($r_4$) just before the first bit ($r_5$) of the data (bits $r_5$ to $r_8$) obtained by dividing the data R of 32 bits into groups of four bits and the bit ($r_9$) just after the last bit ($r_8$) of the data (bits $r_5$ to $r_8$) are used.

The exclusive OR operation of the data R' of 48 bits obtained as mentioned above and encipher key data K of 48 bits is calculated, thereby converting the data R' into data R" of 48 bits.

Next, the data R" is divided into eight blocks ($B'_1$ to $B'_8$) each consisting of six bits. The eight blocks are inputted to eight S boxes (or called selection functions) $S_1$ to $S_8$, respectively.

Each of the S boxes ($S_1$ to $S_8$) has the function of receiving data of six bits and outputting data of four bits.

FIG. 13 is a diagram showing a substitution table of the foregoing S box ($S_1$).

The S box ($S_1$) shown in the diagram includes substitution tables (substitution table numbers [00] to [11]).

When the 6-bit data of the data R" is inputted to the S box ($S_1$), the S box ($S_1$) selects one of the four substitution tables in accordance with the first and last bits of the input 6-bit data.

For instance, in the case where data having a bit pattern of "011011" is used as the input 6-bit data, the S box ($S_1$) selects the substitution table indicated by the bit train "01" comprising a combination of the first bit "0" and the last bit "1" in the data, that is, indicated by the substitution table number [01].

Next, when the central four bits "1101" of the input data are converted into a decimal number, it becomes "13". Therefore, the value "5" indicated by the column 13 of the substitution table "01", that is, of the binary number "0101", is outputted as output data of four bits.

The input data R ($r_1, r_2, \ldots, r_{32}$) is encrypted by executing the above processes of the S box ($S_1$) with respect to the other S boxes ($S_2$ to $S_8$).

In accordance with the DES algorithm, by repeating the foregoing processes including the S boxes sixteen times, the plaintext data of 64 bits is finally converted into the ciphertext data of 64 bits.

As shown in the example of the processes mentioned above, the DES algorithm fundamentally executes the processes on a single bit unit basis.

The nonlinear calculation part in the FEAL process will now be described.

In the FEAL algorithm, for instance, the data R ($r_1, r_2, \ldots, r_{32}$) of the lower 32 bits in the input plaintext data of 64 bits is first divided into four blocks of data ($\alpha^0, \alpha^1, \alpha^2, \alpha^3$) each having eight bits.

Next, by calculating the exclusive OR of each of the block data and the encipher key data ($\beta_0$ to $\beta_3$) of eight bits, the block data is respectively converted into intermediate data ($\gamma^0, \gamma^1, \gamma^2, \gamma^3$). Thereafter, processes of the following function S are executed.

The function S is the function shown by the equation $$S(x_1 + x_2 + \delta) = Rot_2(w)$$

where
$w = (x_1 + x_2 + \delta) \mod 256$
$\delta = 0$ or 1 (constant)

The intermediate data $\gamma^0$ to $\gamma^3$ or the 8-bit data obtained as the result of the processes of the function S are inputted as $x_1$ and $x_2$. The function $Rot_2(w)$ denotes the process to circulate and shift the data $w$ by two bits to the upper or lower bit side.

In accordance with the FEAL algorithm, further, by repeating the foregoing processes eight times for the data obtained as the result of the processes of the function S, the plaintext data of 64 bits is finally converted into the ciphertext data of 64 bits. As shown in the above processes, in the FEAL algorithm, the processes are fundamentally executed on an 8-bit unit basis.

SUMMARY OF THE INVENTION

As the computer networks have been spread and widely used with the advancement of information processes and communicating technique, it is considered to be an effective measure that data on a transmission path or data stored in the computer is enciphered in order to assure information security to guard against illegal use, theft, or the like of the data.

The DES algorithm which was determined as a reference of the encryption algorithm in 1977 by the National Bureau of Standard (N.B.S.) is one of the means for enciphering data.

However, in accordance with the DES algorithm as mentioned above, since an amount of processing which is executed on a bit unit basis is extremely large, if such processing is realized by the software of a microcomputer which fundamentally executes the processes on a bit unit basis, it takes a long time to execute the processes and the practical speed is not obtained.

On the other hand, since the FEAL algorithm fundamentally executes the processes on a byte (eight bits) unit basis, if the processes are realized by the 8-bit microcomputer, the high processing speed which is faster by a few times or more than the speed in the DES algorithm can be accomplished. It is considered that the practical speed of a certain extent is obtained by the FEAL algorithm by using the software of the 8-bit microcomputer.

However, with the advancement of the recent microelectronics technique, in place of the 8-bit microcomputer, the 16-bit microcomputer and, further, the 32-bit microcomputer is used. It is presumed that the ratio of use of 32-bit microcomputers will fairly increase in the near future. Therefore, it is presumed that the further high encryption processing speed will be required in the age of the 32-bit microcomputer. However, since the 32-bit microcomputer fundamentally executes the processes on a 4-byte unit basis, if the FEAL algorithm which was designed for use in the 8-bit microcomputer which fundamentally executes the processes on a one-byte unit basis is intended to implemented with the 32-bit microcomputer, it is inefficient.

Therefore, the encryption algorithm for fundamentally executing the processes on a 4-byte unit basis which is suitable for the 32-bit microcomputer is demanded.

It is, therefore, an object of the present invention to provide an encipher method whereby message data made by a microcomputer or the like is enciphered at a high speed Another object of the invention is to provide a decipher method whereby the ciphertext made by the encipher method is deciphered at a high speed.

To accomplish the above objects, an encipher method of the invention comprises a first encipherment process for converting upper $2^{n-1}$ bits of original data into first data of $2^{n-1}$ bits which was enciphered; and a second encipherment process for converting lower $2^{n-1}$ bits of the original data into second data of $2^{n-1}$ bits which was enciphered, wherein the first encipherment process includes a first step of converting the lower $2^{n-1}$ bits of the original data into first intermediate data by arithmetically operating with a first encipher key, a second step of converting the first intermediate data into second intermediate data by circular shifting the first intermediate data to the upper or lower bit side by only $2^i$ bits ($1 \leq i \leq n-3$), and a third step of converting the upper $2^{n-1}$ bits of the original data into the first intermediate data by arithmetically operating with the second intermediate data, and wherein the second encipherment process includes a fourth step of converting the first data into third intermediate data by arithmetically operating with a second encipher key, a fifth step of converting the third intermediate data into fourth intermediate data by circular shifting the third intermediate data to the upper or lower bit side by only $2^j$ bits ($i+1=j \leq n-2$), and a sixth step of converting the lower $2^{n-i}$ bits of the original data into the second data by a arithmetically operating with the fourth intermediate data.

Assuming that the lower $2^{n-1}$ bits of the original data are set to $M_2$ and the first encipher key is $K_1$, the first step is expressed by, for instance, the following equations, $$\begin{cases} M_2 + K_1 \to x \\ Rot_2(x) + x + 1 \end{cases}$$

Assuming that the first intermediate data is $x'$, the second step is expressed by, for instance, the following equation, $$Rot_4(x') \oplus x'$$

On the other hand, assuming that the first data is WORK1 and the second encipher key is $K_2$, the fourth step is expressed by, for instance, the following equations, $$\begin{cases} WORK1 + K_2 \to x'' \\ Rot_2(x'') + x'' + 1 \end{cases}$$

Assuming that the third intermediate data is $x'''$, the fifth step is expressed by, for instance, the following equation, $$Rot_8(x''') \oplus x'''$$

The operator "+" included in the above equation denotes the modular addition of modulus $2^{n-1}$, for instance, in the case of $M_2 + K_1$ in step 1, the operator "+" denotes the arithmetic operation in which the bit correspondence OR of $M_2$ and $K_1$ is calculated and the bit data is divided by $2^{n-1}$ and the remainder as the result of the division is obtained.

The operator "$\oplus$" denotes the arithmetic operation to get the exclusive OR.

The arithmetic operation function "$Rot_2(x)$" denotes the arithmetic operation to circular shift the data x to the upper or lower bit side by two bits.

Further, in the specification of the present invention, the processes as in the foregoing first and fourth steps are defined as a substitution transformation and the processes as in the foregoing second and fifth steps are defined as a permutation transformation.

According to the foregoing encipher method to which the present invention is applied, as compared with the conventional encipherment process in the DES algorithm, the number of processes for the substitution transformation and permutation transformation can be reduced, so that the encipherment process can be executed at a high speed.

The foregoing and other objects, advantages, manner of operation, and novel features of the present invention will be understood from the following detailed description when read in conjunction with the accompanying drawings.

BRIEF DESCRIPTION OF THE DRAWINGS

FIG. 11 is a diagram showing an extensional permutation table which is used in the encipherment process of the DES algorithm;

FIG. 12 is a diagram showing a bit arrangement of eight block data included in the data made by using the extensional permutation table of FIG. 11; and FIG. 13 is a diagram showing substitution tables of an S. (Substitution) box $S_1$.

DESCRIPTION OF THE PREFERRED EMBODIMENTS

Figure 1:
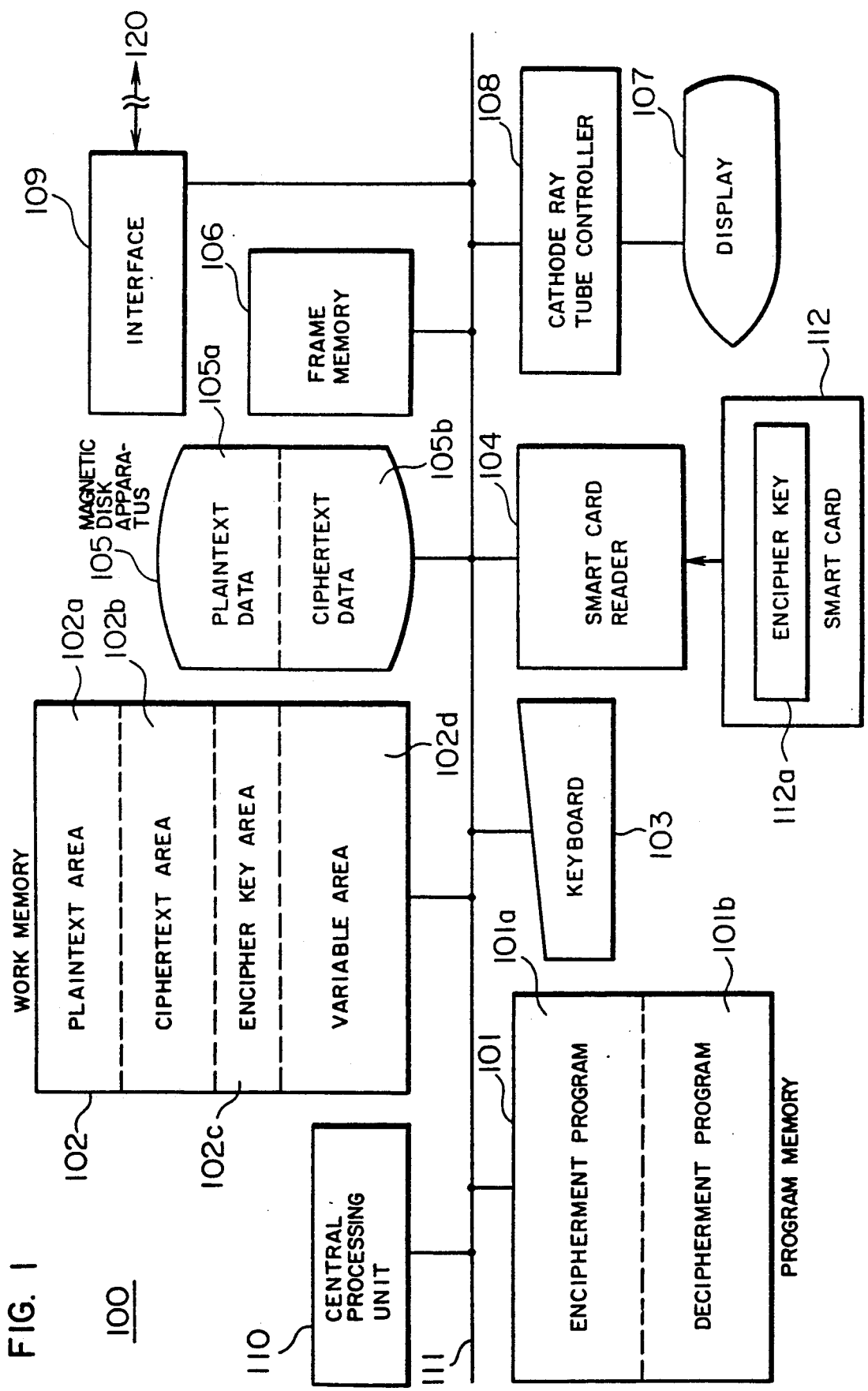
FIG. 1 is a constructional block diagram of a ciphering and deciphering equipment to which the present invention is applied.

FIG. 1 shows a block diagram of a ciphering and deciphering equipment to which the present invention is applied.

A ciphering and deciphering equipment 100 includes a program memory 101; a work memory 102; a keyboard 103 to perform a data input or the like; a smart card reader 104; a magnetic disk apparatus 105; a frame memory 106; a display 107 to display characters, symbols, and the like; a cathode ray tube controller (hereinafter, abbreviated as CRTC) 108; an interface 109 to transmit and receive ciphertext to and from the other terminals; and a central processing unit (hereinafter, abbreviated as CPU) 110 to control the above apparatuses through a common bus 111.

On the other hand, an encipherment program 101a to make a ciphertext from a plaintext and a decipherment program 101b to decipher the plaintext from the ciphertext are stored in the program memory 101. An operator can start either one of the programs 101a and 101b by inputting a special command from the keyboard 103.

Further, the work memory 102 includes a plaintext area 102a to store plaintext data 105a which has previously been stored into the magnetic disk apparatus 105 or the deciphered plaintext data; a ciphertext area 102b to similarly store ciphertext data 105b which has previously been stored into the magnetic disk apparatus 105 or the enciphered ciphertext data; an encipher key area 102c to store encipher keys 112a read out of the smart card by the smart card reader 104; and a variable area 102d to store variables or the like which are used when executing a program.

The ciphering and decipering equipment 100 is connected to the other ciphering and decipering equipment having the same function through a communication network 120 and transmits the ciphertext obtained as the result of the execution of the encipherment program 101a to the other ciphering and decipering equipment by using the interface 109.

In a manner similar to the above, the ciphering and decipering equipment 100 which received the ciphertext transmitted from the other ciphering and decipering equipment starts the decipherment program 101b and can obtain the deciphered message.

A ciphering process and the like which are executed by the ciphering and deciphering equipment 100 will now be described.

Figure 2:
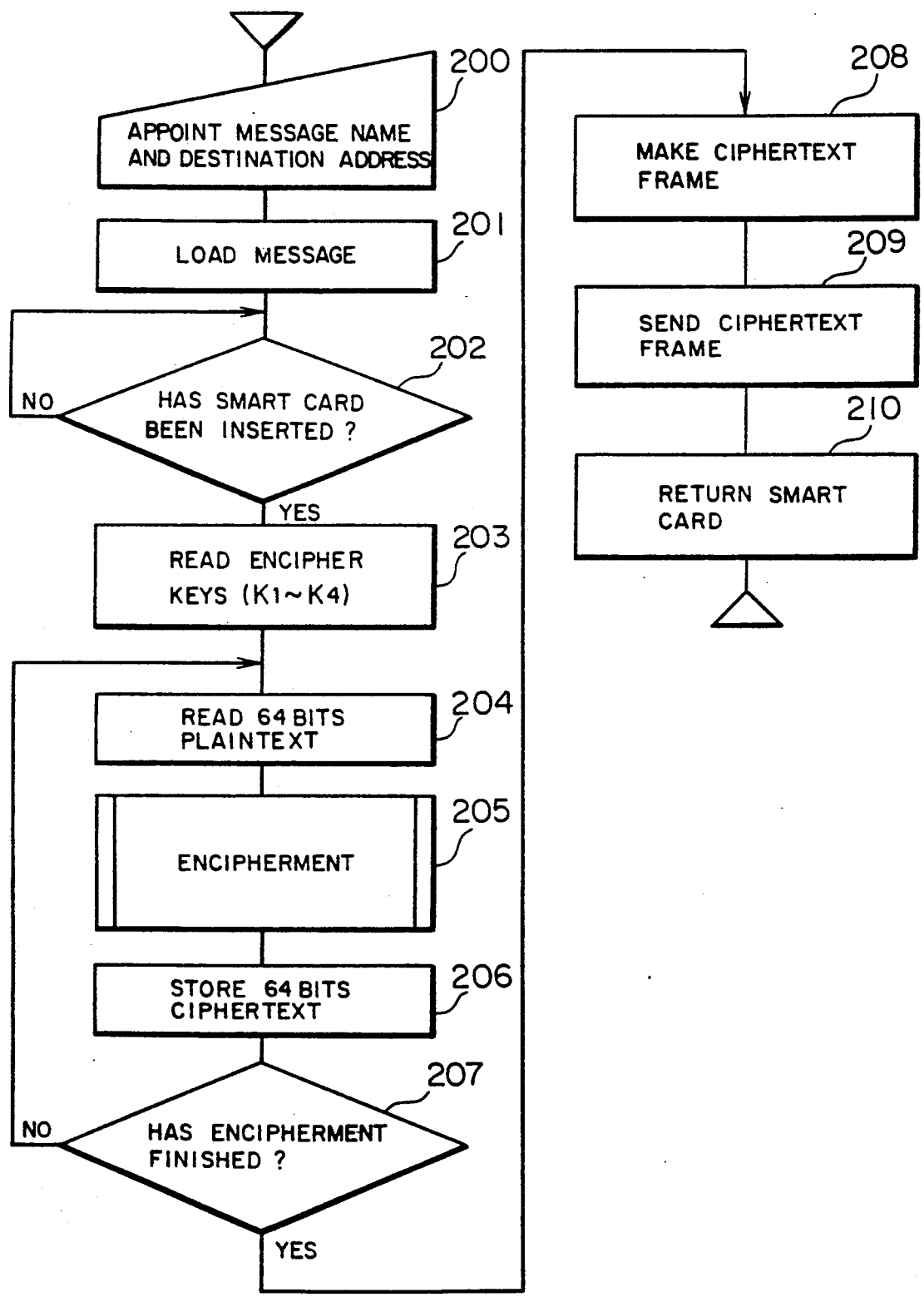
FIG. 2 is a flowchart showing an encipherment process and a ciphertext transmitting procedure according to the invention.

FIG. 2 is a flowchart for the encipherment and transmitting processes which are executed by the ciphering and deciphering equipment 100.

When the operator inputs a special command to the CPU 110 from the keyboard 103, the CPU starts the encipherment program 101a stored in the program memory 101 and sequentially executes the following processes.

When the operator then inputs the name of message to be encrypted and a destination address of the other ciphering and deciphering equipment as a transmission destination side of the ciphertext (step 200), the CPU 110 loads the relevant message from the magnetic disk apparatus 105 into the plaintext area 102a in the work memory 102 and gives an instruction to the CRTC 108 so as to display the message by the CRTC 108 (step 201).

When the display instruction is inputted, the CRTC 108 converts the message stored in the work memory 102 (such a message has been stored in a form of characters, symbols, or codes) into the display data to display on the display 107, stores the display data into the frame memory 106, and displays the display data in the frame memory 106 on the display 107.

On the other hand, when a signal indicative of the insertion of the smart card is inputted from the smart card reader 104 to the CPU 110 (step 202), the CPU advances the program to step 203. In step 203, the encipher keys 112a ($K_1$ to $K_4$) are read out of an inserted smart card 112 and stored into the work memory 102.

It is assumed that the four encipher keys ($K_1$ to $K_4$) 112a are used and each key includes data of 32 bits which has previously been made.

Next, the plaintext of 64 bits is read out of the message stored in the plaintext area 102a in the work memory 102 and stored into the variable area 102d (step 204) and the encipherment process, which will be explained hereinafter, is executed (step 205).

The CPU 110 stores 64 bits of the ciphertext made in step 205 into the ciphertext area 102b (step 206). If all of the messages in the plaintext area 102a have been encrypted, the encipherment process is finished, but if any messages to be encrypted still remain, the processing routine is returned to step 204 in order to encrypt the remaining messages (step 207).

The ciphertexts of the messages are made by the encipherment processes shown in steps 200 to 207 as explained above and stored into the ciphertext area 102b in the work memory 102.

The CPU 110 then instructs the interface 109 so as to make a frame on the basis of the message name which was inputted by the operator in step 200, the ciphertexts made by the processes in steps 200 to 207, and the destination address of the ciphering and deciphering equipment which was inputted by the operator in step 200 (step 208).

When the interface 109 receives the instruction from the CPU 110, the interface makes the ciphertext frame on the basis of the destination address, ciphertexts, and message name and sends the ciphertext frame to the communication network 120 in response to the transmission instruction (step 209) from the CPU 110. On the other hand, the smart card 112 is returned to the operator and the processing routine is finished (step 210).

Figure 3A:
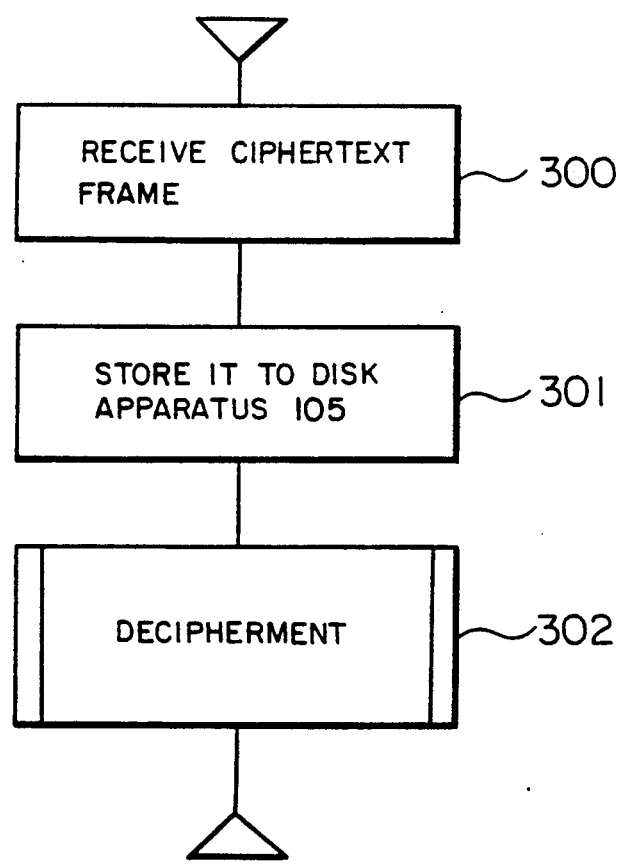
FIGS. 3A and 3B are flowcharts showing a procedure for a decipherment process according to the invention.

FIG. 3A shows a flowchart for the receiving process and the decipherment process of a ciphertext in the case where the ciphering and deciphering equipment 100 has received the ciphertext which had been made by the other ciphering and deciphering equipment by the processes similar to those explained in FIG. 2.

The interface 109 always monitors the ciphertext frame sent from the communication network 120. When the interface 109 receives the ciphertext frame including the destination address to its own ciphering and deciphering equipment 100, the interface informs the CPU 110 of the reception of the frame (step 300).

When the CPU 110 receives the notification of the reception of the frame, the CPU makes the message name included in the received ciphertext correspond to the ciphertext and stores them as the ciphertext data 105b into the magnetic disk apparatus 105 (step 301).

When a special decipherment command is inputted from the keyboard 103 to the CPU 110, the CPU starts the decipherment program 101b stored in the program memory 101 and executes the decipherment process of the ciphertext data 105b stored in the disk apparatus 105 (step 302).

Figure 3B:
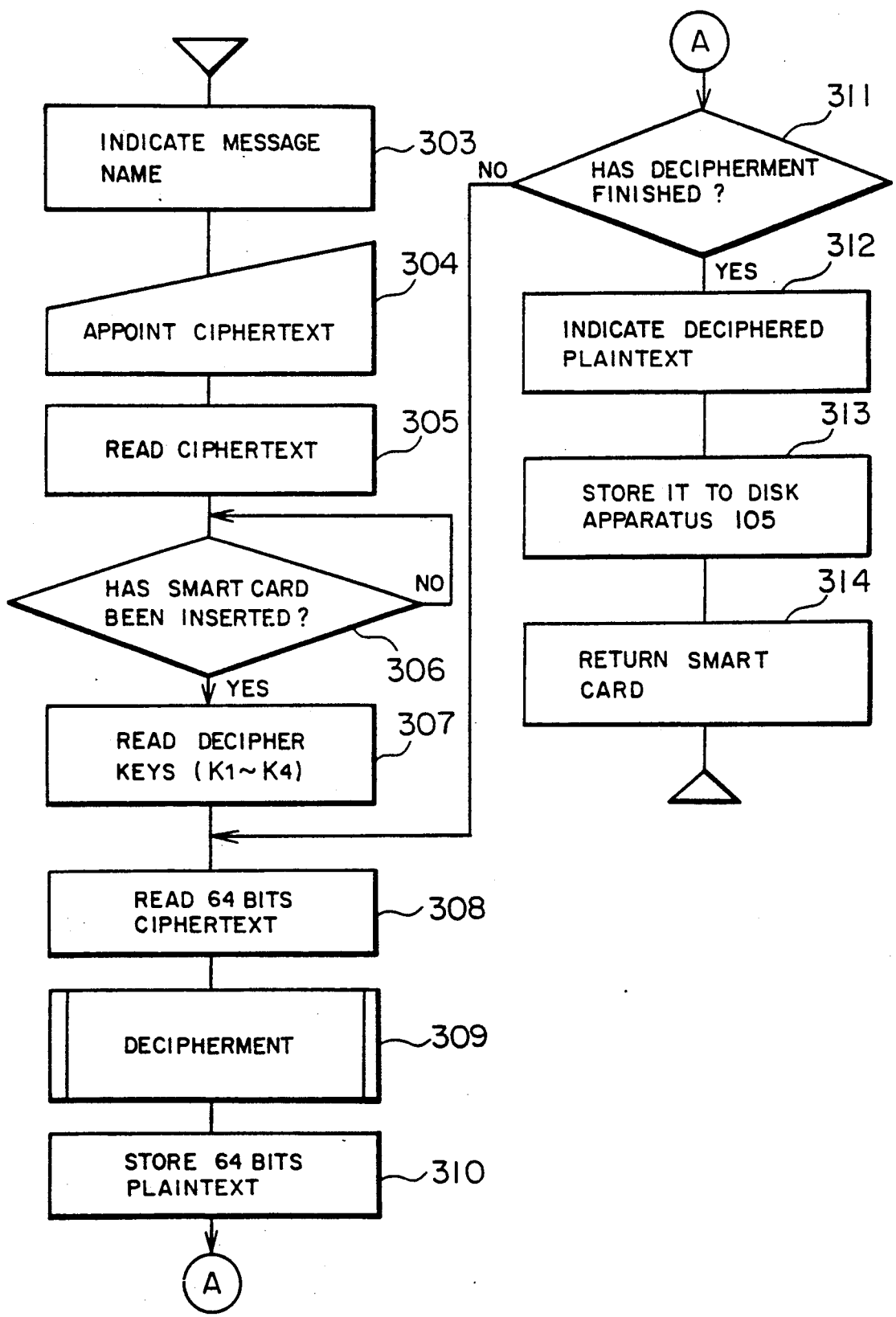

FIG. 3B is a detailed flowchart for the decipherment process of the ciphertext which is executed by the ciphering and deciphering equipment 100.

In step 302, when the decipherment program 101b is started as mentioned above, the CPU 100 accesses the message name of the ciphertext data 105b stored in the disk apparatus 105 into the work memory 102 and instructs the CRTC 108 so as to display the message name (step 303).

When a message name of the ciphertext to be deciphered is appointed by the operator through the keyboard (step 304), the CPU 110 loads the ciphertext corresponding to the appointed message name from the disk apparatus 105 into the ciphertext area 102b in the work memory 102 (step 305).

Next, when the signal indicative of the insertion of the smart card 112 is inputted from the smart card reader 104 to the CPU 110 (step 306), the CPU advances the program to the next step 307. In step 307, the encipher keys 112a ($K_1$ to $K_4$) are read out of the inserted smart card 112 and stored into the encipher key area 102c in the work memory 102.

Next, the ciphertext of 64 bits is read out from the ciphertext stored in the ciphertext area 102b (step 308) and is subjected to the decipherment process, which will be explained hereinlater (step 309), and the deciphered plaintext is stored into the plaintext area 102a every 64 bits (step 310).

When all of the ciphertexts are deciphered, the decipherment process is finished, but when any ciphertexts to be deciphered still remain, the processing routine is returned to step 308 in order to decipher the remaining ciphertexts (step 311).

Next, the CPU 110 instructs the CRTC 108 so as to display the deciphered message in the plaintext area 102a (step 312). The CPU 110 makes the deciphered message correspond to the message name and stores them as the plaintext data 105a into the disk apparatus 105 (step 313). The smart card 112 is returned to the operator (step 314) and the processing routine is finished.

Figure 4:
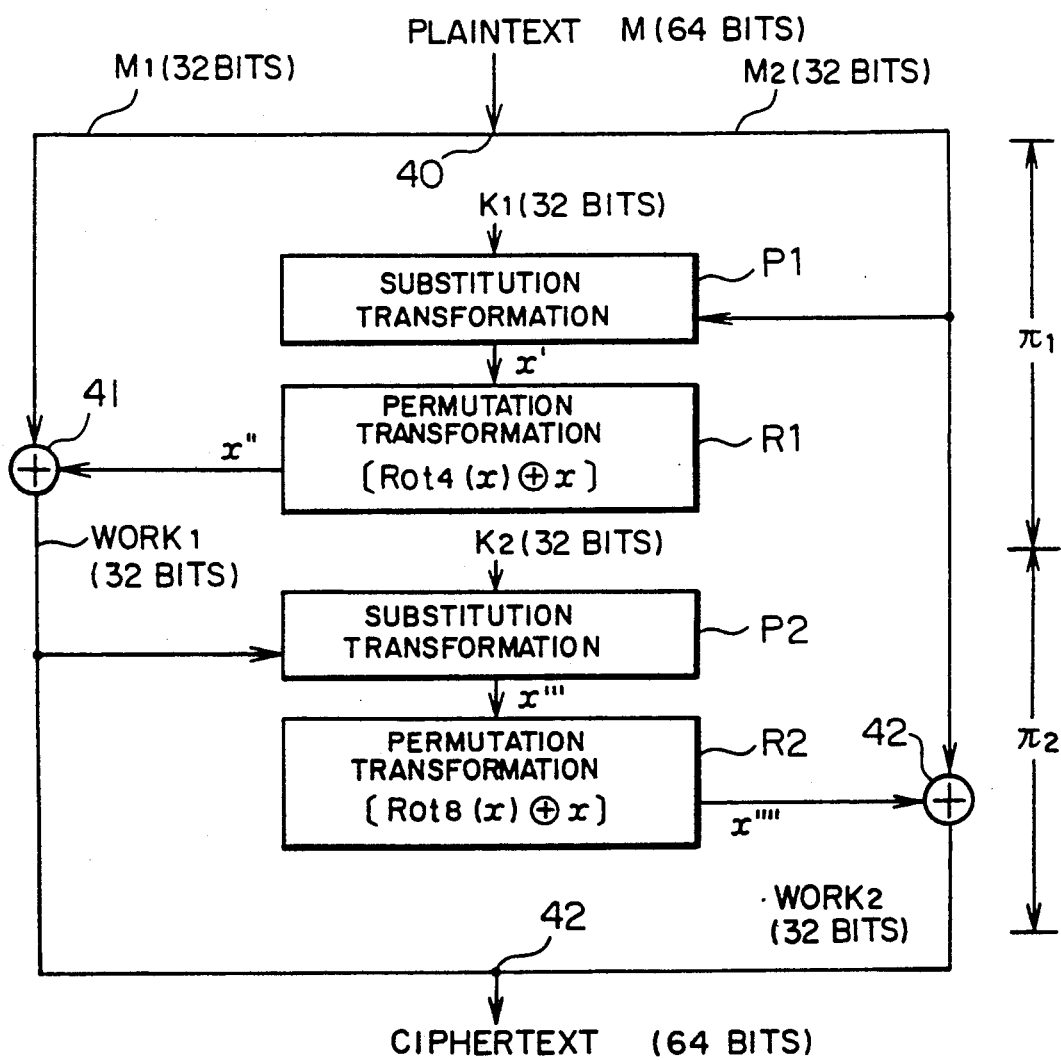
FIG. 4 is a diagram for explaining a simplified outline of the encipherment process to which the invention is applied.

FIG. 4 shows a diagram for explaining a simple outline of the encipherment process (205 in FIG. 2) to which the invention is applied.

The diagram shows a state in which $M_1$ of upper 32 bits and $M_2$ of lower 32 bits in the plaintext M (64 bits) which was read out in step 204 in FIG. 2 are converted into the ciphertext (64 bits) in which upper 32 bits are set to WORK1 and lower 32 bits are set to WORK2 by using the encipher keys $K_1$ and $K_2$.

$P_1$ to $P_2$ and $R_1$ to $R_2$ shown in FIG. 4 denote main processes in the encipherment process to which the invention is applied. The processes $P_1$ to $P_2$ correspond to the foregoing substitution transformation and the processes $R_1$ to $R_2$ correspond to the foregoing permutation transformation.

According to the substitution transformation $P_1$, for instance, the modular addition of the 32-bit data $M_2$ and the encipher key $K_1$ which was read out in step 203 is executed and the resultant data is set to first intermediate data x, the modular addition of the data which is obtained by circular shifting the first intermediate data x to the upper or lower bit side by two bits and the first intermediate data is executed and the resultant data is set to second intermediate data x', and the second intermediate data x' is outputted.

The substitution transformation $P_1$ can be expressed by the following equations.

$$\begin{cases} \text{First intermediate data } x \leftarrow M_2 + K_1 \\ \text{Second intermediate data } x' \leftarrow Rot_2(x) + x + 1 \end{cases}$$

The operator + denotes the modular addition of modulus $2^{32}$. In the above equations, the bit correspondence OR of $M_2$ and $K_1$ is calculated and the result of the OR is divided by $2^{32}$ and the remainder as the result of the division is used as the operator +.

The substitution transformation $P_1$ can be defined as a process such that an arbitrary one bit of the message $M_2$ exerts an influence on the four bits of the second intermediate data x' as the result of the output as will be obvious from the above equations.

Next, according to the permutation transformation $R_1$, for instance, third intermediate data x" is made by calculating the exclusive OR of the data which is obtained by circular shifting the second intermediate data x' to the upper or lower bit side by four bits and the second intermediate data x'.

The permutation transformation $R_1$ can be expressed by the following equation.

$$\text{The third intermediate data } x'' \leftarrow Rot_4(x') \oplus x'$$

As mentioned above, the operator $\oplus$ is used to calculate the bit correspondence exclusive OR.

On the other hand, the data $M_1$ is converted into the upper 32 bits (WORK1) of the ciphertext by an arithmetic operating process 41 (exclusive OR) with the third intermediate data x".

The substitution transformation $P_2$ is the process to make fourth intermediate data x''' from at least the WORK1 and the encipher key $K_2$ and can be expressed by the following equation.

$$\text{Fourth intermediate data } x''' \leftarrow WORK1 + K_2$$

The permutation transformation $R_2$ is the process to make fifth intermediate data $x''''$ from the fourth intermediate data $x'''$ and can be expressed by the following equation.

Fifth intermediate data $x'''' \leftarrow \text{Rot}_8(x''') \oplus x'''$

The data $M_2$ is converted into the lower 32 bits (WORK2) of the ciphertext by an arithmetic operating process 42 (exclusive OR) with the fifth intermediate data $x''''$.

According to the present invention, 64 bits of the plaintext can be converted into 64 bits of the ciphertext by the above-mentioned processes $P_1$ to $P_2$, $R_1$ to $R_2$, and 41 to 42.

However, in the above embodiment, the ratio of the bit having a possibility in which an arbitrary one bit among 64 bits of the plaintext exerts an influence on the constructional bits of the ciphertext is merely 16/32.

As a preferred embodiment of the invention, the ciphertext made by the processes $P_1$ to $P_2$ and $R_1$ to $R_2$ is used as an input text and, further, the substitution transformation and permutation transformation as shown in $P_1$ and $R_1$ or $P_2$ and $R_2$ are repeated.

In such a case, it should be noted that the content of the permutation transformation to be repeated includes the process shown by the equation $\text{Rot}_{16}(x) \oplus x$. An embodiment in such a case will be described hereinbelow in FIG. 6.

On the other hand, among the foregoing processes, the processes comprising the processes $P_1$, $R_1$, and 41 are defined as a function $\pi_1$ of two inputs and two outputs as shown below and the processes comprising the processes $P_2$, $R_2$, and 42 are defined as a function $\pi_2$ of two inputs and two outputs as shown below.

Thus, the encipherment process shown in FIG. 4 can be expressed as follows.

WORK1, WORK2 $= \pi_2 \cdot \pi_1(M_1, M_2)$

Therefore, the processes described as a preferred embodiment mentioned above can be expressed by WORK1, WORK2 $= \pi'_1 \cdot \pi_2 \cdot \pi_1(M_1, M_2)$ As mentioned above, $\pi'_1$ denotes a function including the permutation transformation as shown by $\text{Rot}_{16}(x) \oplus x$.

Another embodiment of the encipherment process (step 205 in FIG. 2) will now be described.

Figure 5:
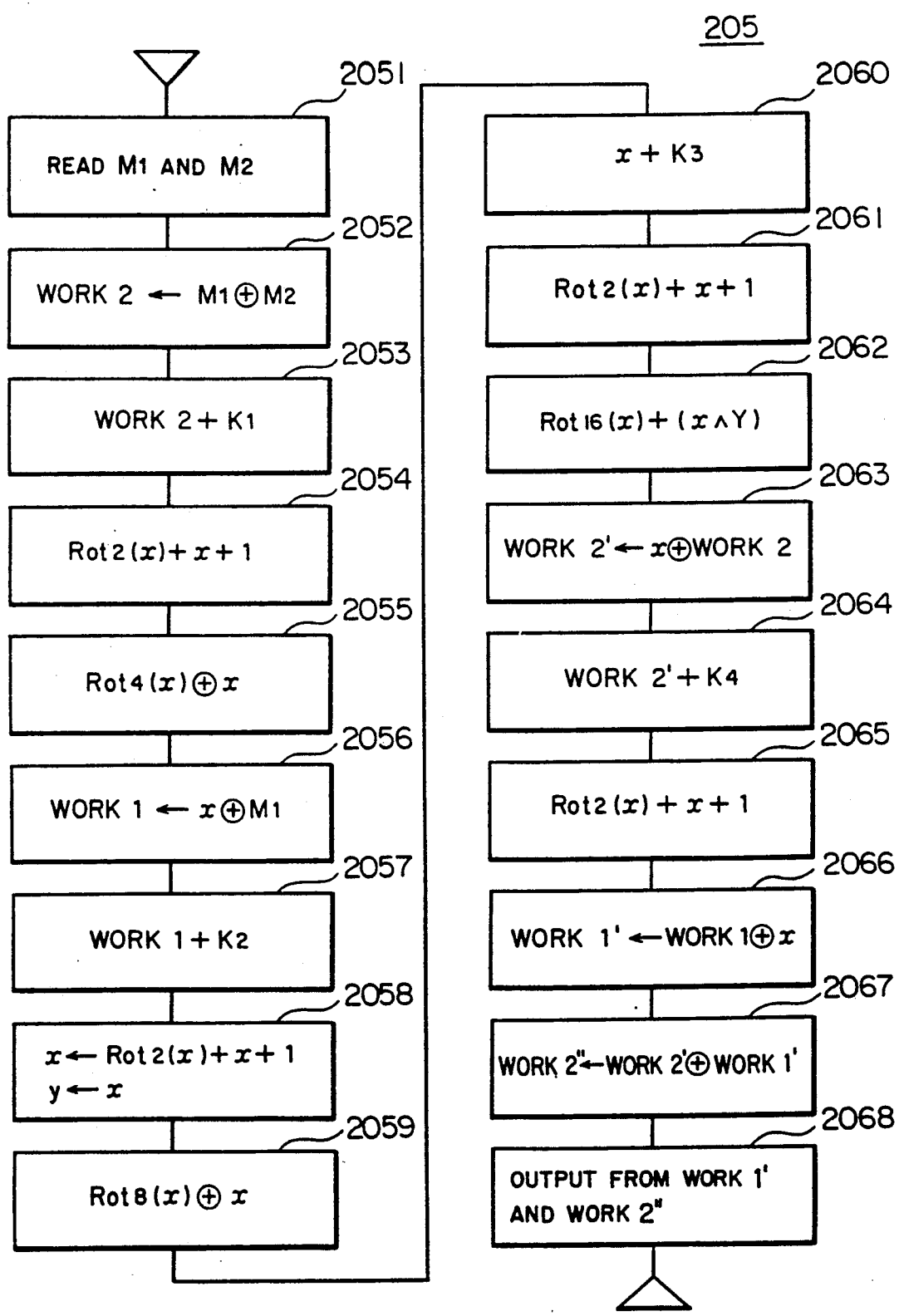
FIG. 5 is a flowchart showing in detail a procedure for the encipherment process according to the invention.

FIG. 5 is a detailed flowchart for the encipherment process (step 205 in FIG. 2) in another embodiment.

In the encipherment process, x, y, WORK1, WORK1', WORK2, WORK2', and WORK2" are used as variables and the encipher keys $K_1$ to $K_4$ which were read out in step 203 are used as constants.

The CPU 110 divides the plaintext of 64 bits which was read out in step 204 into the plaintext $M_1$ of upper 32 bits and the plaintext $M_2$ of lower 32 bits (step 2051). The bit correspondence exclusive OR of $M_1$ and $M_2$ is calculated and the resultant bit data is stored as WORK2 into the variable area 102d in the work memory 102 (step 2052).

It is now defined hereinafter that the arithmetic operating process shown in step 2052 is expressed by WORK2 $\leftarrow M_1 \oplus M_2$ in the specification of the present invention and the operator $\oplus$ is used to calculate the exclusive OR as mentioned above.

In step 2053, the modular addition of the WORK2 obtained in step 2052 and the encipher key $K_1$ is performed and the result of the addition is stored as x into the variable area 102d.

It is now assumed hereinafter that the arithmetic operating process shown in step 2053 is expressed by x $\leftarrow$ WORK2 + $K_1$ in the specification of the present invention and the operator "+" denotes the modular addition of the modulus $2^{32}$ as mentioned above, that is, the bit correspondence logical OR operation of the WORK2 and $K_1$ is calculated, the resultant bit data is divided by $2^{32}$, and the remainder of the division is used as the operator "+".

In step 2054, the modular addition of the bit data obtained by circular shifting the resultant x to the left by two bits and x and 1 is executed and the result of the addition is stored as x into the variable area 102d.

It is now assumed hereinafter that the arithmetic operating process shown in step 2054 is expressed by x $\leftarrow \text{Rot}_2(x) + x + 1$ in the specification of the present invention, and in the embodiment, the arithmetic operating function $\text{Rot}_2(x)$ circular shifts the data x to the left by two bits. Therefore, $\text{Rot}_n(x)$ denotes that the data x is circular shifted to the left by n bits.

In step 2055, the exclusive OR of the bit data obtained by circular shifting the data x obtained in step 2054 to the left by four bits and x is calculated and the resultant data is stored as x into the variable area 102d.

Such an operation can be expressed by the following equation.

x $\leftarrow \text{Rot}_4(x) \oplus x$

In the next step 2056, the bit correspondence exclusive OR of the data x obtained in step 2055 and the $M_1$ derived in step 2051 is calculated and the resultant bit data is stored as WORK1 into the variable area 102d.

(Equation: WORK1 $\leftarrow x \oplus M_1$)

In step 2057, the modular addition of the WORK1 obtained in step 2056 and the encipher key derived in step 203 is executed and the resultant data is stored as x into the variable area 102d.

(Equation: x $\leftarrow$ WORK1 + $K_2$)

In step 2058, the modular addition of the bit data obtained by circular shifting the data x obtained in step 2057 to the left by two bits and x and 1 is executed and the resultant data is stored as x into the variable area 102d. The value of x is stored as y into the variable area 102d.

(Equations: x $\leftarrow \text{Rot}_2(x) + x + 1$, y $\leftarrow x$)

In step 2059, the exclusive OR of the bit data obtained by circular shifting the data x obtained in step 2058 to the left by eight bits and x is calculated and the resultant data is stored as x into the variable area 102d.

(Equation: $x \leftarrow Rot_8(x) \oplus x$)

In step 2060, modular addition of the data x obtained in step 2059 and the encipher key $K_3$ obtained in step 203 is executed and the resultant data is stored as x into the variable area 102d.

(Equation: $x \leftarrow x + K_3$).

In step 2061, the modular addition of the bit data obtained by circular shifting the data x obtained in step 2060 to the left by two bits and x and l is performed and the resultant data is stored as x into the variable area 102d.

(Equation: $x \leftarrow Rot_2(x) + x + 1$)

In step 2062, the modular addition of the bit data obtained by circular shifting the data x derived in step 2061 to the left by 16 bits and the bit correspondence AND of x and y derived in step 2058 is executed and the resultant data is stored as x into the variable area 102d.

It is now defined hereinbelow that the arithmetic operating process shown in step 2062 is expressed by $$x \leftarrow Rot_{16}(x) + (x \psi y)$$

in the specification of the present invention and an operator $\psi$ is used to calculate the bit correspondence AND.

In step 2063, the exclusive OR of the data x obtained in step 2062 and the WORK2 derived in step 2052 is calculated and the resultant data is stored as WORK2' into the variable area 102d.

(Equation: $WORK2' \leftarrow x \oplus WORK2$)

In step 2064, the modular addition of the WORK2' obtained in step 2063 and the encipher key $K_4$ derived in step 203 is performed and the resultant data is stored as x into the variable area 102d.

(Equation: $\leftarrow x\ WORK2' + K_4$)

In step 2065, the modular addition of the bit data obtained by circular shifting the data x derived in step 2064 to the left by two bits and x and l is performed and the resultant data is stored as x into the variable area 102d.

(Equation: $x \leftarrow Rot_2(x) + x + 1$)

In step 2066, the exclusive OR of the WORK1 obtained in step 2056 and the data x derived in step 2065 is calculated and the resultant data is stored as WORK1' into the variable area 102d.

(Equation: $WORK1' \leftarrow WORK1 \oplus x$)

In step 2067, the exclusive OR of the WORK2' obtained in step 2063 and the WORK1' derived in step 2066 is calculated and the resultant data is stored as WORK2'' into the variable area 102d.

(Equation: $WORK2'' \leftarrow WORK2' \oplus WORK1'$)

In step 2068, a ciphertext of 64 bits is made from the WORK1' (32 bits) obtained in step 2066 and the WORK2'' (32 bits) derived in step 2067 and an encipherment processing routine 205 (FIG. 2) is finished. Upper 32 bits of the ciphertext are made from the WORK1' and lower 32 bits are made from the WORK2''.

Figure 6:
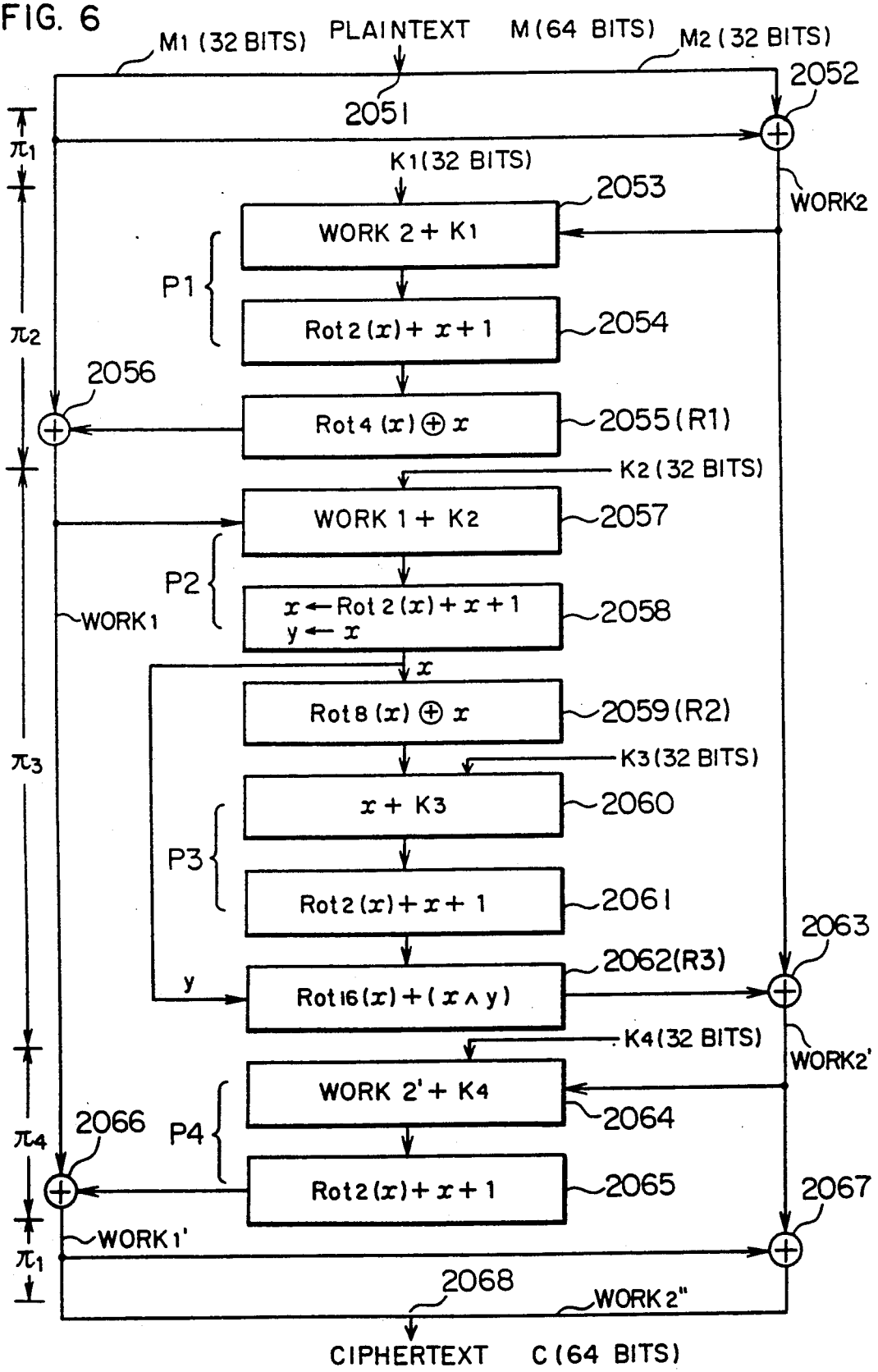
FIG. 6 is a diagram for explaining a step of enciphering a message in the encipherment process shown in FIG. 4.

FIG. 6 is a diagram showing an outline of the encipherment process described in FIG. 5.

In the diagram, a block or the like shown by using a numeral indicates each process in the encipherment process to which the invention is applied. Each process corresponds to each step (steps 2051 to 2068) in the flowchart shown in FIG. 5.

Among the processes in the foregoing encipherment process, the substitution transformations shown by $P_1$ to $P_4$ in the diagram and the permutation transformations shown by $R_1$ to $R_3$ in the diagram are the main processes.

The substitution transformations $P_1$ to $P_4$ are the processes which are mainly based on the substitution transforming function called the modular adding processes of the encipher keys $K_1$ to $K_4$ and the like and the data, respectively. The processes $P_1$ to $P_4$ correspond to steps 2053 to 2054 ($=P_1$), steps 2057 to 2058 ($=P_2$), steps 2060 to 2061 ($=P_3$), and steps 2064 to 2065 ($=P_4$) which are expressed by the following equations, respectively.

$$\begin{cases} x \leftarrow WORK\ (\text{or } x) + K_i(i = 1 \text{ to } 4) \\ x \leftarrow Rot_2(x) + x + 1 \end{cases}$$

On the other hand, the permutation transformations $R_1$ to $R_3$ are the processes which are mainly based on the permutation transforming functions to circular shift the input data to the left by $2^n$ (n=2, 3, 4) bits, respectively.

The processes $R_1$ to $R_3$ correspond to step 2055 ($=R_1$), step 2059 ($=R_2$), and step 2062 ($R_3$) which are expressed by the following equation, respectively.

$$Rot_{2n}(x) \oplus x\ (n=2, 3, 4)$$

The relation between the encipherment process and the decipherment process will now be described. The encipherment process can be expressed as a synthetic function of the two-input and two-output functions $\pi_1$ to $\pi_4$ as shown below when excluding the process (step 2051) to read out the upper 32 bits as $M_1$ and the lower 32 bits as $M_2$ from the message M which was read out in step 308 and the process (step 2068) to output the ciphertext C (64 bits) from the WORK1' (32 bits) and the WORK2'' (32 bits) obtained in steps 2066 and 2067.

Therefore, the processes in the encipherment process of the embodiment can be shown by the synthetic function such as the following functional equation.

$$C(WORK1', WORK2'') = \pi_1 \cdot \pi_4 \cdot \pi_3 \cdot \pi_2 \cdot \pi_1\ (M(M_1, M_2))$$

For instance, among the foregoing functions $\pi_1$ to $\pi_4$ in FIG. 5, the function $\pi_1$ corresponds to step 2052 and is the function for receiving $M_1$ (32 bits) and $M_2$ (32 bits) as input values and for outputting $M_1$ and WORK2 as output values.

The function $\pi_2$ corresponds to steps 2053 to 2056 and is the function for receiving $M_1$ and WORK2 as input values and for outputting WORK1 and WORK2 as output values.

The function $\pi_3$ corresponds to steps 2057 to 2063 and is the function for receiving WORK1 and WORK2 as input values and for outputting WORK1 and WORK2' as output values.

The function $\pi_4$ correspond to steps 2064 to 2066 and is the function for receiving WORK1 and WORK2' as input values and for outputting WORK1' and WORK2' as output values.

The function $\pi_1$ corresponds to step 2067 and is the function for receiving WORK1' and WORK2' as input values and for outputting WORK1' and WORK2" as output values.

On the other hand, all of the functions $\pi_i$ (i=1 to 4) have the characteristic such that when the same function transformation is repeated twice, the transformed data value $\pi_i(x)$ is returned to the original data value x, that is $$\pi_i \cdot \pi_i(x) = x$$

Therefore, if the same function is used as a deciphering function of the foregoing decipherment process, the ciphertext C can be deciphered to the original plaintext M.

That is, such a process can be expressed by the following function.

$$M(M_1, M_2) = \pi_1 \cdot \pi_2 \cdot \pi_3 \cdot \pi_4 \cdot \pi_1 (C(WORK1', WORK2''))$$

Therefore, the decipherment process 309 (FIG. 3B) can be expressed by a flowchart (not shown) such as to satisfy the function.

Figure 7:
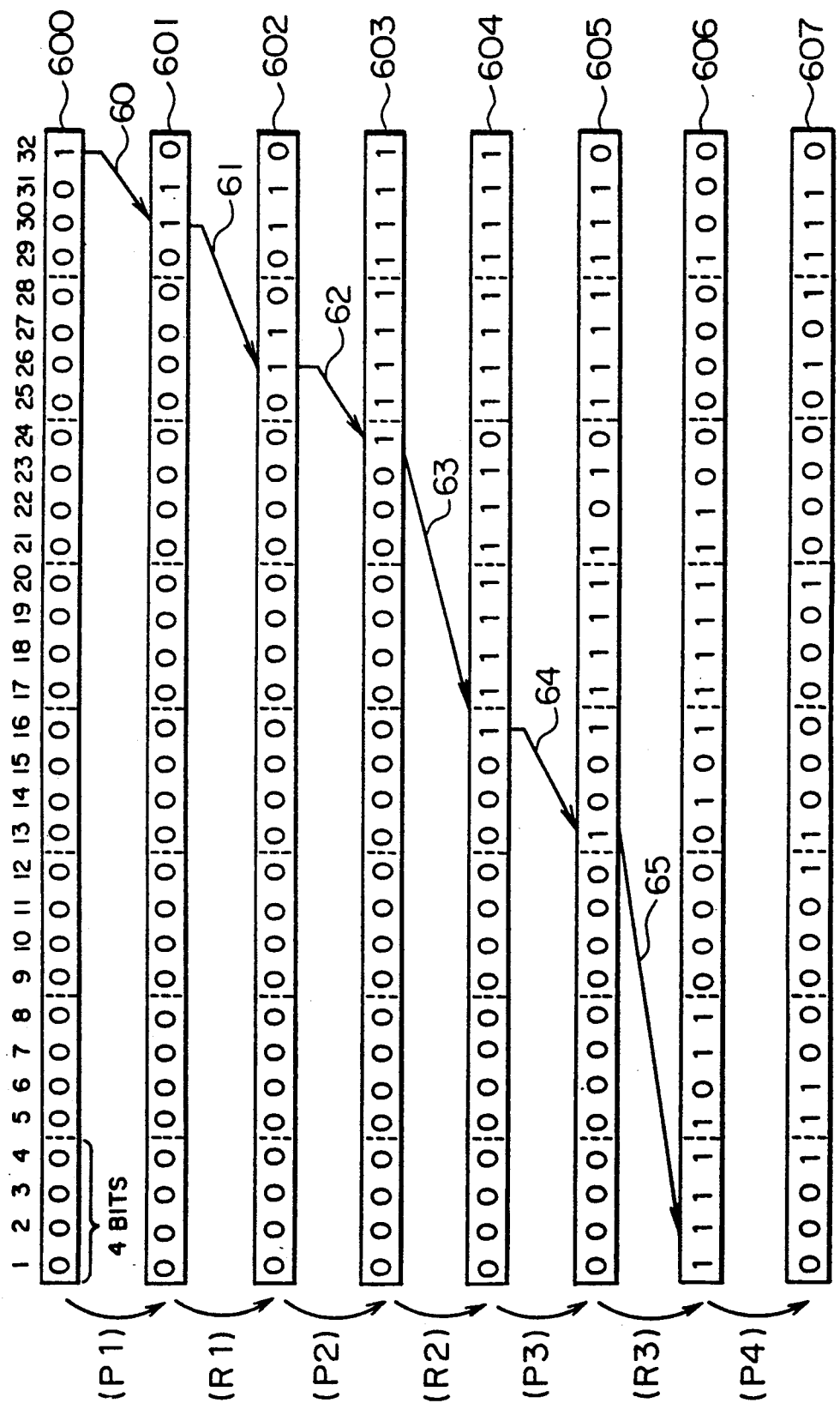
FIG. 7 is a diagram for explaining changes in bit trains of data before and after a substitution transformation and a permutation transformation shown in FIG. 5.

FIG. 7 is a diagram slowing changes in bit trains of the data before and after the substitution transformation ($P_1$ to $P_4$) and the permutation transformation ($R_1$ to $R_3$) in FIG. 6.

To simplify the explanation, the message M which is inputted assumes the data in which only the least significant bit among 64 bits is set to "1" and all of the other bits are set to "0".

The encipher keys $K_1$ to $K_4$ which are subjected to the modular additions in steps 2053, 2057, 2060, and 2064 assume the data of 32 bits which are all set to "0".

Data 600 is data of the lower bit train $M_2$ obtained in step 2051.

Data 601 is data of the variable x obtained as the result of the processes in steps 2052 to 2054, that is, the substitution transformation $P_1$.

As shown by an arrow 60, "1" of the 32nd bit of the data 600 influences at least the 30th and 31st bits of the data 601.

Data 602 is data of the variable x obtained as the result of the process in step 2055, that is, the permutation transformation $R_1$.

Data 603 is data of the variable x derived by executing the processes in steps 2056 to 2058, that is, the substitution transformation $P_2$ for the data x obtained in step 2055.

Data 604 is data of the variable x obtained as the result of the process in step 2059, that is, the permutation transformation $R_2$.

Data 605 is data of the variable x obtained by executing the processes in steps 2060 to 2061, that is, the substitution transformation $P_3$ for the data 604.

Data 606 is data of the variable x obtained by executing the process in step 2062, that is, the permutation transformation $R_3$ for the data 605.

Data 607 is data of the variable WORK2" obtained as the result of the processes in steps 2063 to 2067, that is, the substitution transformation $P_4$.

Arrows 60 to 65 show states in which "1" of the 32nd bit of the data 600 influences the other bits during each step of the substitution transformation ($P_1$ to $P_4$) and the permutation transformation ($R_1$ to $R_3$).

As will be obviously understood from the diagram, according to the invention, the value "1" of the 32nd bit of the lower bit data $M_2$ in the data 600 in the plaintext M can exert an influence on all of the bits of the data 606 of x obtained as the result of the process in step 2062.

Although the above embodiment has been described with respect to the processes expressed by the function $$C = \pi_1 \cdot \pi_4 \cdot \pi_3 \cdot \pi_2 \cdot \pi_1 (M)$$

as the processes for the encipherment process, for instance, the function such that the above function is repeated twice can be also used as a modification. That is, $$C = \pi_1 \cdot \pi_2 \cdot \pi_3 \cdot \pi_4 \cdot \pi_1 \cdot \pi_4 \cdot \pi_3 \cdot \pi_2 \cdot \pi_1 (M)$$

In this case, the equation for the decipherment transformation is $$M = \pi_1 \cdot \pi_2 \cdot \pi_3 \cdot \pi_4 \cdot \pi_1 \cdot \pi_1 \cdot \pi_2 \cdot \pi_3 \cdot \pi_4 \cdot \pi_1 (C)$$

Similarly, the function such that the embodiment is repeated n times can be also used as the encipherment transformation.

Further, although the invention has been described with respect to the ciphering and deciphering equipment suitable for the 32-bit microcomputer, it can be also applied to the 16-bit microcomputer.

Figure 8:
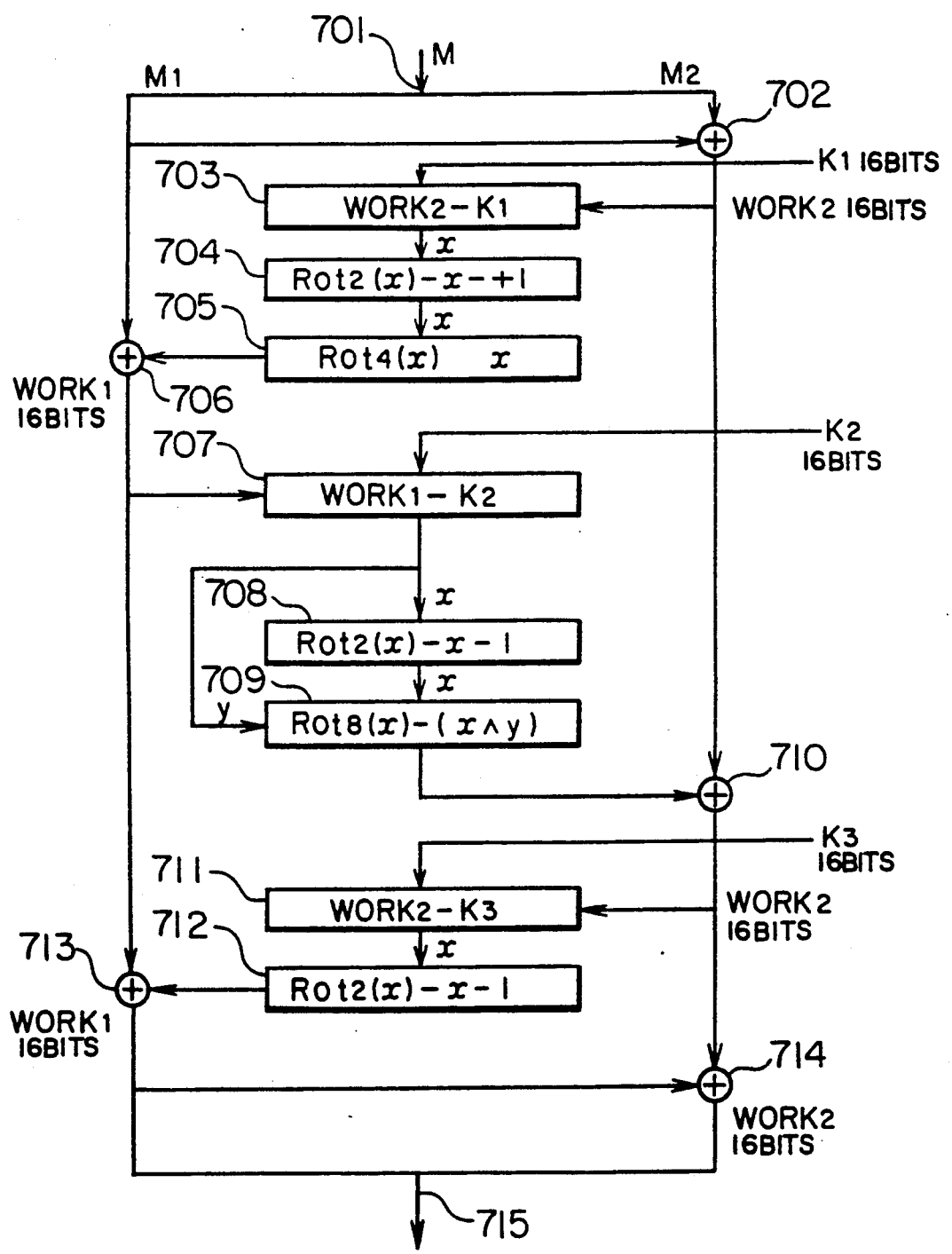
FIG. 8 is a diagram showing an outline of the encipherment process in the case where the invention is applied to a 16-bit microcomputer.

FIG. 8 is a diagram showing the outline of the decipherment process in the case where the invention is applied to the 16-bit microcomputer.

The processes in steps 701 to 715 will be described by mainly using the steps and equations in order to simplify the description.

STEP 701:

The input data M is divided into $M_1$ of upper 16 bits and $M_2$ of lower 16 bits.

STEP 702:

The bit correspondence exclusive OR of $M_1$ and $M_2$ is calculated.

$$WORK2 \leftarrow M_1 \oplus M_2$$

STEP 703:

The modular subtraction of the data x and the encipher key $K_1$ is executed.

$$x \leftarrow x - K_1$$

$x - K_1$ denotes the modular subtraction of modulus $2^{16}$ such as to obtain the remainder which is derived by dividing the difference between x and $K_1$ by $2^{16}$.

Hereinafter, "−" denotes the similar process.

STEP 704:

The modular subtraction of the bit data which is obtained by circular shifting the data x to the left by two bits and 1 is executed.

$$x \leftarrow \text{Rot}(x) - x - 1$$

STEP 705:

The exclusive OR of the bit data which is obtained by circular shifting the data x to the left by four bits and the data x is calculated.

$$x \leftarrow \text{Rot}_4(x) \oplus x$$

STEP 706:

$$\text{WORK1} \leftarrow x \oplus M_1$$

STEP 707:

$$x \leftarrow \text{WORK1} - K_2$$

$$y \leftarrow x$$

STEP 708:

$$x \leftarrow \text{Rot}_2(x) - x - 1$$

STEP 709:

$$x \leftarrow \text{Rot}_8(x) - (x \psi y)$$

STEP 710:

$$\text{WORK2} \leftarrow x \oplus \text{WORK2}$$

STEP 711:

$$x \leftarrow \text{WORK2} - K_3$$

STEP 712:

$$x \leftarrow \text{Rot}_2(x) - x - 1$$

STEP 713:

$$\text{WORK1} \leftarrow \text{WORK1} \oplus x$$

STEP 714:

$$\text{WORK2} \leftarrow \text{WORK2} \oplus \text{WORK1}$$

STEP 715:

The WORK1 is outputted as upper 16 bits of the output data and the WORK2 is outputted as lower 16 bits of the output data.

In the embodiment (FIG. 1), the encipher keys $K_1$ to $K_4$ which are necessary for the encipherment process have been read out of the smart card 112. However, it is also possible to construct an embodiment in a manner such that the encipher keys are stored as key data into the magnetic disk apparatus 105 and when the encipherment process is executed, the key data is read out and used as the encipher keys.

Further, in the above embodiment, the ciphertext made by the ciphering and deciphering equipment has been sent to the other equipment by using the communication network. However, it is also possible to construct an embodiment in a manner such that the ciphertext made is written into a memory in the smart card 112 and in the case of deciphering the ciphertext written in the smart card, both of the ciphertext and the encipher key are read out of the smart card.

Figure 9:
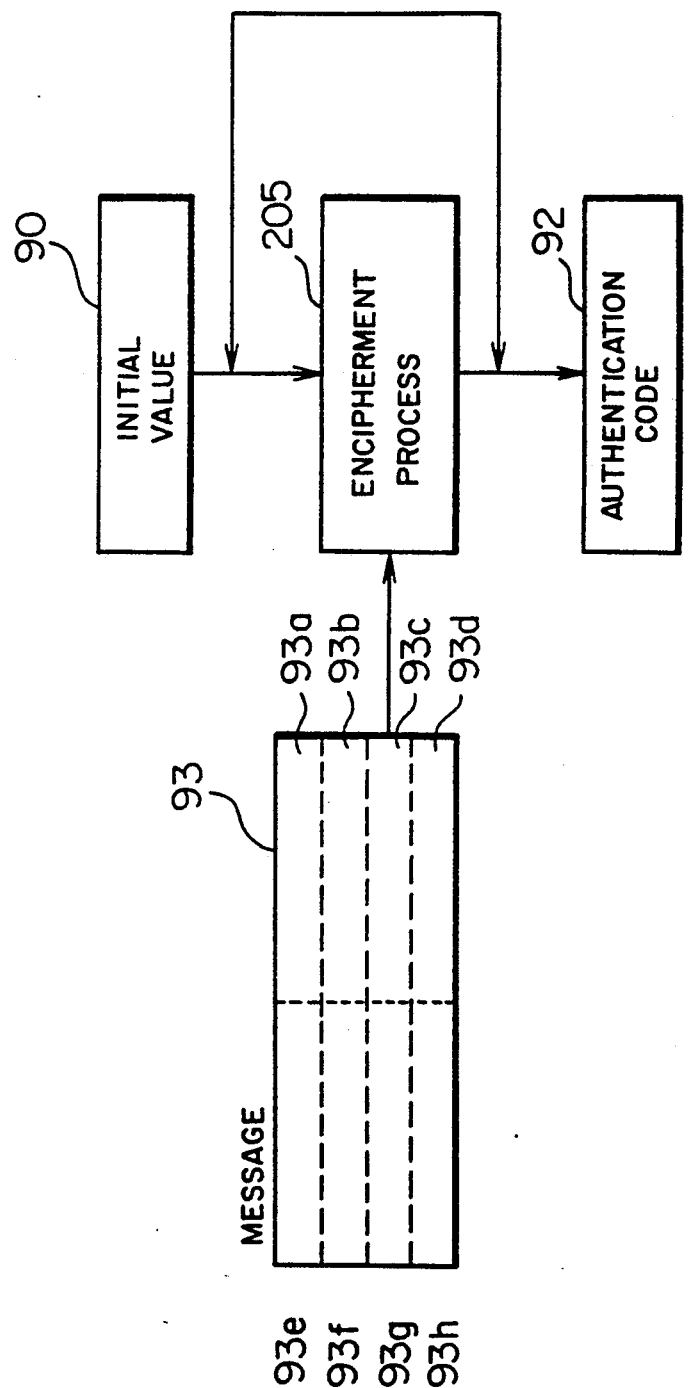
FIG. 9 is a diagram showing an outline of a method of authenticating a received message by using the encipherment process of the invention.

FIG. 9 shows a schematic diagram of an authenticating method of a received message using the encipherment process according to the invention.

(1) A message 93 (for instance, 256 bits = 8 × 32 bits) to be used for the reception authentication is used as key data and an arbitrary initial value 90 (64 bits) is encrypted by using the algorithm 205 according to the invention.

(2) The result 92 of the encryption is again encrypted by data 93e to 93h subsequent to messages 93a to 93d used in the above item (1). Similarly, such an operation is repeated until the end of message.

(3) the final encryption result is outputted as a message authentication code 92.

Figure 10:
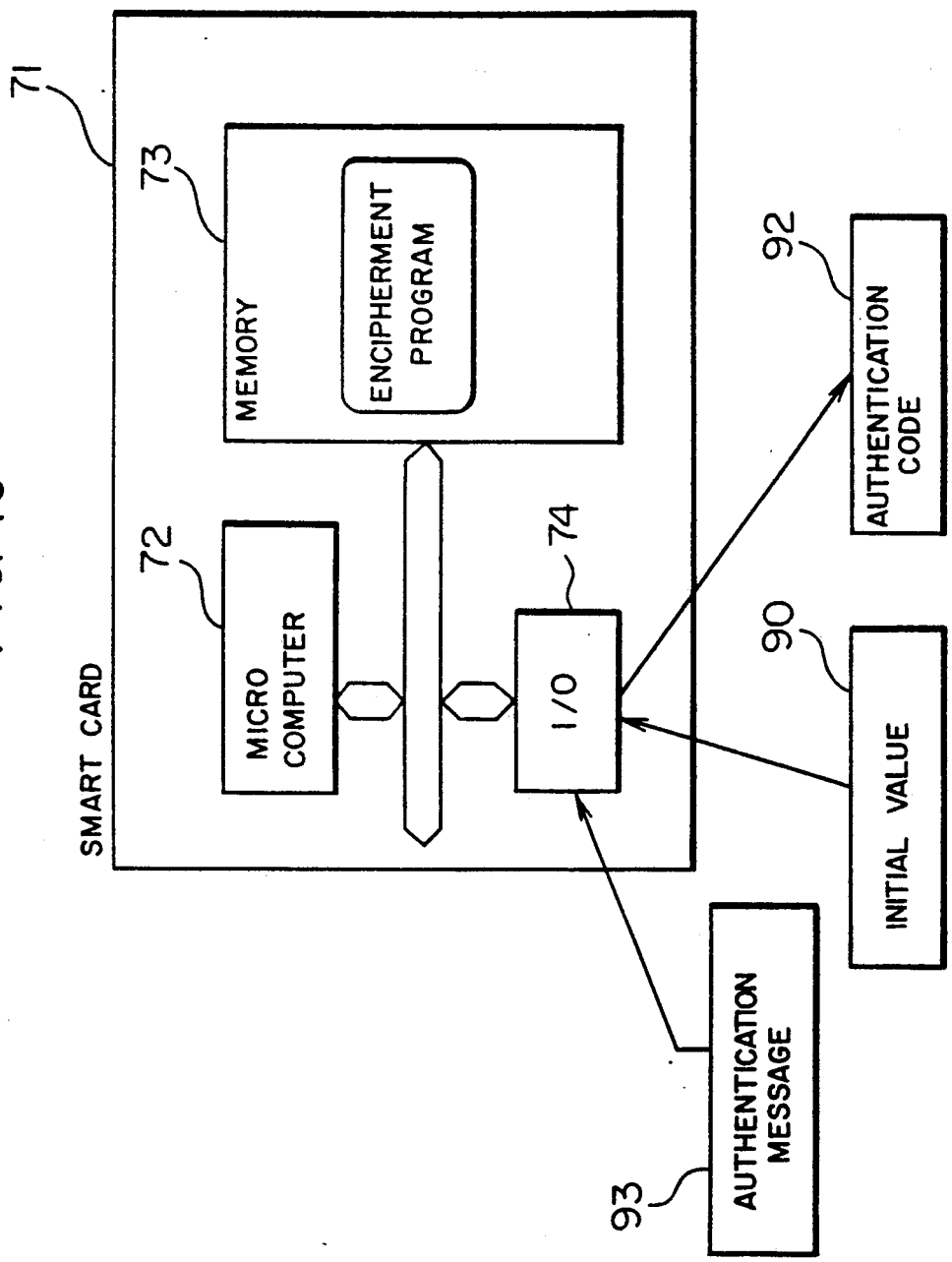
FIG. 10 is a constructional block diagram of a smart card to which the authenticating method of a received message in FIG. 9 is applied.

FIG. 10 shows a block constructional diagram of a smart card to which the authenticating method of a received message which has been described in FIG. 9 is applied.

In FIG. 1, the smart card 112 has only the function to store the encipher keys 112a. Therefore, as mentioned above, the ciphering and deciphering equipment 100 has at least the CPU 110 to execute the program and the program memory 101 to store the encipherment program 101a.

However, a smart card 71 shown in FIG. 10 includes a microcomputer 72 having the same function as the CPU 110; a memory 73 to store the encipherment program 101a; and an I/O 74 to perform the input/output control between the microcomputer 72 and each apparatus in the ciphering and deciphering equipment such as work memory 102, keyboard 103, and magnetic disk apparatus 105.

Therefore, for instance, the case of applying the received message authenticating method shown in FIG. 9 will now be described.

(1) The microcomputer 72 transmits the initial value 90 necessary to authenticate the message from the magnetic disk apparatus 105 to the microcomputer 72 in the smart card 71 through the I/O 74.

(2) In a manner similar to the above item (1), the message 93 to execute the authentication is sequentially transmitted to the microcomputer 72. The microcomputer 72 makes the message authentication code 92 by the decipherment program 101a stored in the memory 73.

As will be understood from the above description (particularly, FIG. 6), according to the encipher method and decipher method of the invention, there is an advantage such that the encipherment process can be performed at a high speed. Similarly, there is an advantage such that the decipherment process can be executed at a high speed.

We claim:

1. An enciphering method for converting a pair of plain text data into a pair of ciphertext data by sequentially performing a plurality of encipherment processes on said pair of plaintext data, each of encipherment processes having a function to restore a pair of ciphered text data to a pair of former text data if each of said encipherment processes is performed again on said pair of ciphered text data, comprising the steps of:
performing a first encipherment process for deriving a first pair of data from said pair of plain text data;
performing a second encipherment process for deriving a second pair of data from said first pair of data by circular shifting of first intermediate data derived from one of said first pair of data by a first predetermined number of bits;

performing a third encipherment process for deriving a third pair of data from said second pair of data by circular shifting of second intermediate data derived from one of said second pair of data by a second predetermined number of bits which are different from said first predetermined number of bits; and performing a fourth encipherment process or other encipherment processes by deriving said pair of ciphertext data from said third pair of data.

2. An enciphering method according to claim 1, wherein said first intermediate data is generated by arithmetically operating on said one of first pair of data and an enciphering key data having predetermined bits pattern.

3. An apparatus for converting a pair of plain text data into a pair of ciphertext data by sequentially performing a plurality of encipherment processes on said pair of plain text data, each of encipherment processes having a function to restore a pair of ciphered text data to a pair of former text data if each of said encipherment processes is performed again on said pair of ciphered text data, said apparatus comprising:

data memory for storing a pair of plain text data, a pair of ciphertext data derived from said pair of plain text data and intermediate data generated in each of said encipherment processes;

program memory for storing an enciphering program for performing said encipherment processes; and processor for executing said enciphering program including:

an instruction set for arithmetically operating on one of said pair of plain text data and other of said pair of plain text data in a first encipherment process for deriving a first pair of data from said pair of plain text data;

an instruction set for circular shifting of first intermediate data derived from one of said first pair of data by a first predetermined number of bits in a second encipherment process for deriving a second pair of data from said first pair of data;

an instruction set for circular shifting of third intermediate data derived from one of said second pair of data by a second predetermined number of bits which are different from said first predetermined number of bits in a third encipherment process for deriving a third pair of data from said second pair of data; and an instruction set for generating said pair of ciphertext data by arithmetically operating on said third pair of data in a fourth encipherment process or other encipherment processes.

4. An apparatus according to claim 3, wherein said program memory further stores an enciphering key data having predetermined bits pattern, and said first intermediate data is generated by arithmetically operating on said enciphering key data and said one of first pair of data.

5. An apparatus for generating code data by performing a plurality of arithmetical processes on message data, comprising:

memory means for storing initial data having predetermined bits pattern, said message data, intermediate data generated during performing said arithmetical processes, and code data obtained by performing said arithmetical processes on said initial data and said message data;

program memory for storing a program for performing said arithmetical processes; and processor for executing said program including:

a first instruction set for generating first intermediate data by performing arithmetical operation on first intermediate data derived from said initial data and a first portion of said message data;

a second instruction set for generating third intermediate data by circular shifting of said second intermediate data by a first predetermined number of bits;

a third instruction set for generating fourth intermediate data by arithmetical operation on fifth intermediate data derived from said third intermediate data and a second portion of said message data;

a fourth instruction set for circular shifting said fourth intermediate data by a second predetermined number of bits which are different from said first predetermined number of bits; and a fifth instruction set for generating said code data from sixth intermediate data generated by executing said fourth instruction set.

6. A method for generating code data by executing a plurality of arithmetical processes on message data, comprising the steps of:

performing a first process generating a first intermediate data by arithmetically operating on second intermediate data derived from initial data having predetermined bits pattern and a first portion of said message data;

performing a second process generating third intermediate data by circular shifting of said first intermediate data by first predetermined number of bits;

performing a third process generating fourth intermediate data by arithmetically operating on fifth intermediate data derived from said third intermediate data and a second portion of said message data;

performing a fourth process generating sixth intermediate data by circular shifting of said fourth intermediate data by second predetermined number of bits which are different from said first predetermined number of bits; and performing a fifth process for generating said code data by arithmetically operating on said sixth intermediate data.

7. An enciphering method for converting a pair of plaintext data into a pair of ciphertext data by sequentially performing a plurality of encipherment processes on said pair of plaintext data, each of said encipherment processes having a function to restore a pair of ciphered text data to a pair of former text data if each of said encipherment processes is performed again on said pair of ciphered text data, comprising the steps of:

performing a first encipherment process for deriving a first pair of data from said pair of plaintext data;

performing a second encipherment process for deriving a second pair of data from said first pair of data by circular shifting of first intermediate data derived from one of said first pair of data by a first predetermined number of bits;

performing a third encipherment process for deriving a third pair of data from said second pair of data, said third encipherment process including the steps of:

generating second intermediate data by arithmetically operating on one of said second pair of data;

generating third intermediate data by circular shifting of said second intermediate data by a second predetermined number of bits which is different from said first predetermined number of bits;

circular shifting fourth intermediate data derived from said third intermediate data by a third predetermined number of bits which is different from said second predetermined number of bits; and arithmetically operating on said second intermediate data and said fourth intermediate data which was circular shifted;

said encipherment process further comprising the step of:

performing a fourth encipherment process or other encipherment processes by deriving said pair of ciphertext data from said third pair of data.

8. An apparatus for converting a pair of plaintext data into a pair of ciphertext data by sequentially performing a plurality of encipherment processes on said pair of plaintext data, each of said encipherment processes having a function to restore a pair of ciphered text data to a pair of former text data if each of said encipherment processes is performed again on said pair of ciphered text data, said apparatus comprising:

a data memory for storing a pair of plaintext data, a pair of ciphertext data derived from said pair of plaintext data, said intermediate data generated in each of said encipherment processes;

a program memory for storing an enciphering program for performing said encipherment processes; and a processor for executing said enciphering program, said processor operating on the basis of an instruction set including:

an instruction set for arithmetically operating on one of said pair of plaintext data and the other of said pair of plaintext data in a first encipherment process for deriving a first pair of data from said pair of plaintext data;

an instruction set for circular shifting of first intermediate data derived from one of said first pair of data by a first predetermined number of bits in a second encipherment process for deriving a second pair of data from said first pair of data;

an instruction set for circular shifting of third intermediate data derived from one of said second pair of data by a second predetermined number of bits which is different from said first predetermined number of bits;

an instruction set for circular shifting of fourth intermediate data derived from said circular shifted third intermediate data by a third predetermined number of bits which is different from said second predetermined number of bits and for arithmetically operating on said circular shifted fourth intermediate data, said third intermediate data, and said fourth intermediate data in a third encipherment process for deriving a third pair of data from said second pair of data; and an instruction set for generating said pair of ciphertext data by arithmetically operating on said third pair of data in a fourth encipherment process or other encipherment processes.

9. An apparatus for generating code data by performing a plurality of arithmetical processes on message data, comprising:

memory means for storing initial data having a predetermined bit pattern, said message data, intermediate data generated while performing said arithmetical processes, and code data obtained by performing said arithmetical processes on said initial data and said message data;

a program memory for storing a program for performing said arithmetical processes; and a processor for executing said program, said processor operating on the basis of an instruction set including:

a first instruction set for generating first intermediate data by performing an arithmetical operation on first intermediate data derived from said initial data and a first portion of said message data;

a second instruction set for generating third intermediate data by circular shifting of said second intermediate data by a first predetermined number of bits;

a third instruction set for generating fourth intermediate data by arithmetically operating on fifth intermediate data derived from said third intermediate data and a second portion of said message data;

a fourth instruction set for circular shifting said fourth intermediate data by a second predetermined number of bits which is different from said first predetermined number of bits;

a fifth instruction set for generating sixth intermediate data by arithmetically operating on said fourth intermediate data and a third portion of said message data;

a sixth instruction set for generating seventh intermediate data by circular shifting of said sixth intermediate data by a third predetermined number of bits which is different from said second predetermined number of bits and by arithmetically operating on said seventh intermediate data, said sixth intermediate data, and said fourth intermediate data; and a seventh instruction set for generating said code data from eighth intermediate data generated by executing said sixth instruction set.

10. A method for generating code data by executing a plurality of arithmetical processes on message data, comprising the steps of:

performing a first process for generating first intermediate data by arithmetically operating on second intermediate data derived from initial data having a predetermined bit pattern and a first portion of said message data;

performing a second process for generating third intermediate data by circular shifting of said first intermediate data by a first predetermined number of bits;

performing a third process for generating fourth intermediate data by arithmetically operating on fifth intermediate data derived from said third intermediate data and a second portion of said message data;

performing a fourth process for generating sixth intermediate data by circular shifting of said fourth intermediate data by a second predetermined number of bits which is different from said first predetermined number of bits;

performing a fifth process for generating seventh intermediate data by arithmetically operating on said sixth intermediate data and a third portion of said message data;

performing a sixth process for generating eighth intermediate data by circular shifting of said seventh intermediate data by a third predetermined number of bits which is different from said second predetermined number of bits and by arithmetically operating on said eighth intermediate data, said seventh intermediate data, and said fourth intermediate data; and performing a seventh process for generating said code data by arithmetically operating on said eighth intermediate data.

* * * * *